July 16, 1935. S. F. GLEASON 2,008,301
MEAT PROCESSING AND MOLDING DEVICE
Filed Sept. 25, 1933 4 Sheets-Sheet 1

Inventor:-
Stanley F. Gleason
by his Attorneys

July 16, 1935.　　　　S. F. GLEASON　　　　2,008,301
MEAT PROCESSING AND MOLDING DEVICE
Filed Sept. 25, 1933　　　4 Sheets-Sheet 2
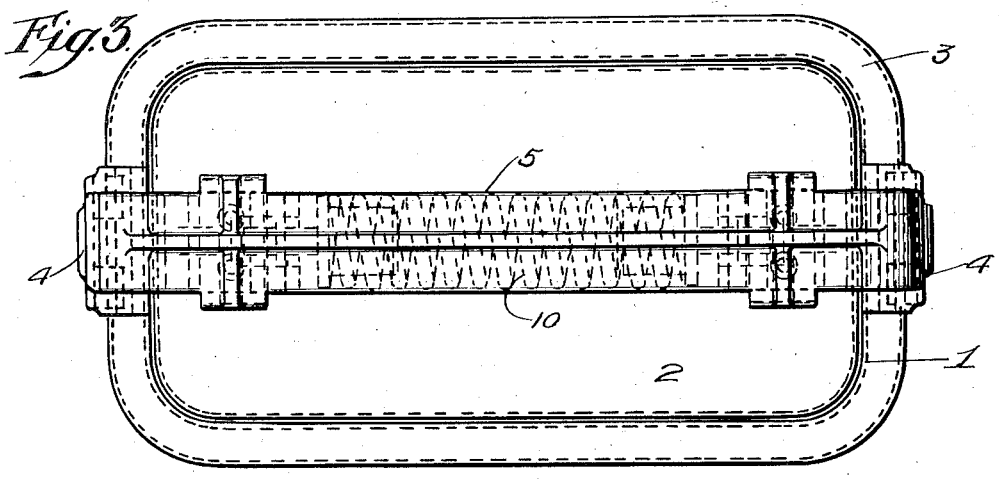
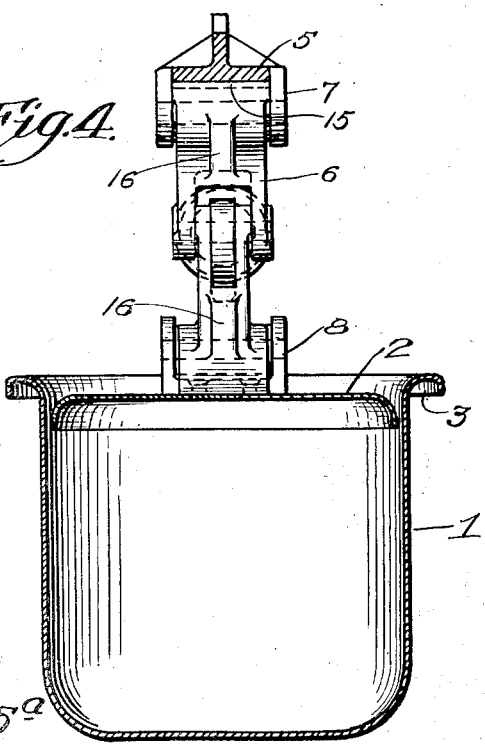
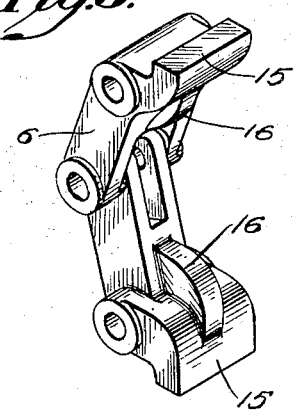
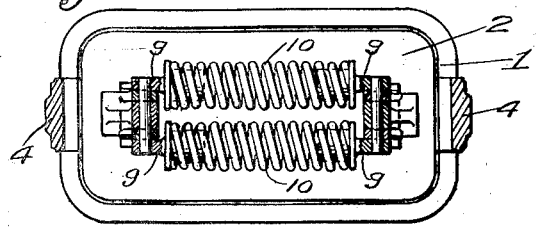
Inventor:—
Stanley F. Gleason
by his Attorneys Inventor:—
Stanley F. Gleason
by his Attorneys July 16, 1935.　　　　S. F. GLEASON　　　　2,008,301
MEAT PROCESSING AND MOLDING DEVICE
Filed Sept. 25, 1933　　　4 Sheets-Sheet 4
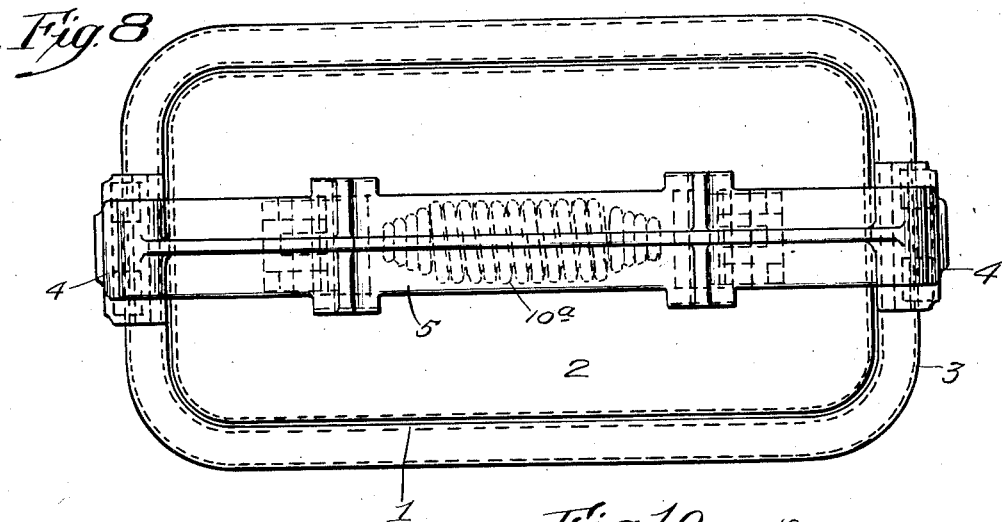
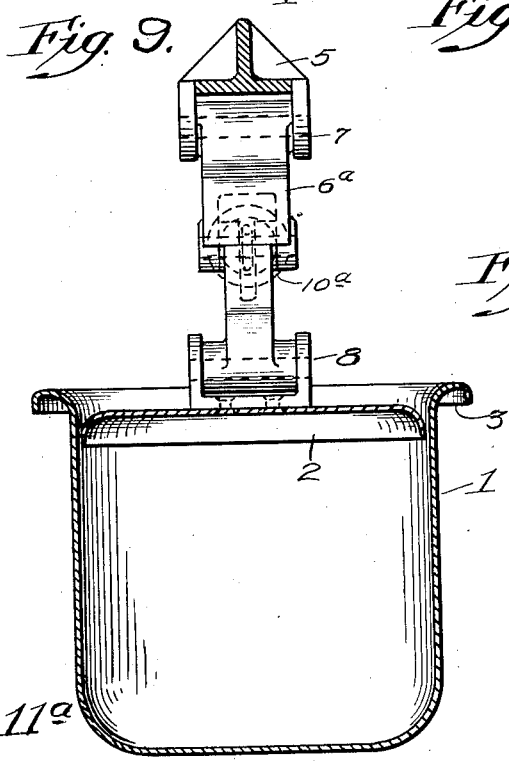
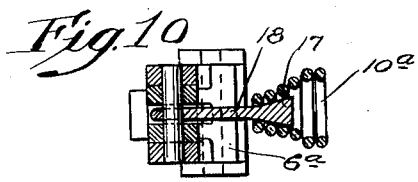
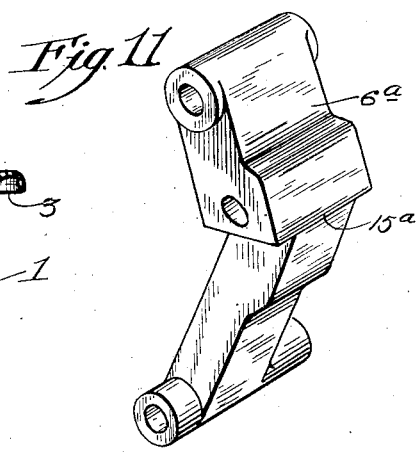
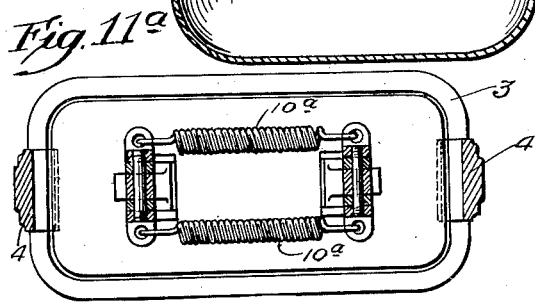
Inventor:—
Stanley F. Gleason
by his Attorneys Patented July 16, 1935

2,008,301

UNITED STATES PATENT OFFICE 2,008,301

MEAT PROCESSING AND MOLDING DEVICE

Stanley F. Gleason, Overbrook, Pa.

Application September 25, 1933, Serial No. 690,841

6 Claims. (Cl. 100—57)

This invention relates to a new and useful device for molding cured, boned and fatted meats in accordance with present packing-house practice. More specifically, the invention relates to a new and useful device for compressing boned and fatted meats, such as hams, in a mold casing having the desired shape or contour which it is desired to impart to the meats. Another purpose of this invention is to produce a molded ham or other meat to the desired homogeneousness so that it may be placed upon a slicing machine without breaking apart during the slicing operation. The desired end is achieved by means of a pressure or follower plate which coacts with the casing to mold the meat, the desired pressure being obtained by means of novel mechanism co-operating with the pressure plate and casing to exert equalizing pressure on the plate at all times during the molding operation. In the specific form herein illustrated, the said mechanism comprises specifically a cross-bar with ratchet elements attached to the opposed ends thereof for adjustable attachment to the casing, toggle elements or links connecting the said bar to the pressure plate, and energy storing means in the form of one or more helical springs extending between and connecting the toggle elements. The arrangement is such that energy is stored in the spring by collapse of the toggle elements during adjusting attachment of the cross-bar to the casing and thereafter the stored energy is used to expand the toggle elements and exert continuous pressure on the pressure plate as the meat within the casing shrinks or contracts due to the heat treatment commonly employed.

One of the primary objects of the invention is, therefore, to provide a device in which a uniform equalizing pressure is exerted upon the meat to be molded so that the loaf may be uniform in contour as indictated by the walls and bottom of the casing and the inner surface of the pressure plate.

Another object of the invention is to provide a manually operable device of the stated character which eliminates the need and use of a press owing to the uniformity of the action of the pressure-applying means and the ease with which pressure may be applied to the meat being treated.

A further object of the invention is to provide a device of this class which is adapted to collapse to a minimum space-occupying condition so that a maximum number of such devices may be placed in a cooking or heating vat and waste of space is entirely eliminated.

A more specific object of the invention is to provide a telescopic chamber or casing which completely houses the spring or other energy-storing means so that accumulation of fats, greases, dirt, etc., on the spring is substantially eliminated as is also the corrosion incident to such accumulation.

These and other objects, as well as the novel features of construction of several embodiments of the invention, may be clearly understood from the following detailed description and the accompanying drawings.

In the drawings:

Figure 3 is a plan view of the device.

Figure 4 is a sectional view taken along line 4—4 of Fig. 1.

Figure 5 is a perspective view of one of the toggle links of the device.

Figure 5A is a view partly in plan and partly in section of a modification of the device.

Figure 8 is a plan view of this device.

Fig. 9 represents a vertical sectional view of the device shown in Fig. 8, certain parts being shown in elevation.

Figure 10 is a detail view of the connection between the spring and a toggle link.

Figure 11 is a perspective view of one of the toggle links, and

Figure 11A is a view partly in plan and partly in section of a modification of this device.

Figure 1:
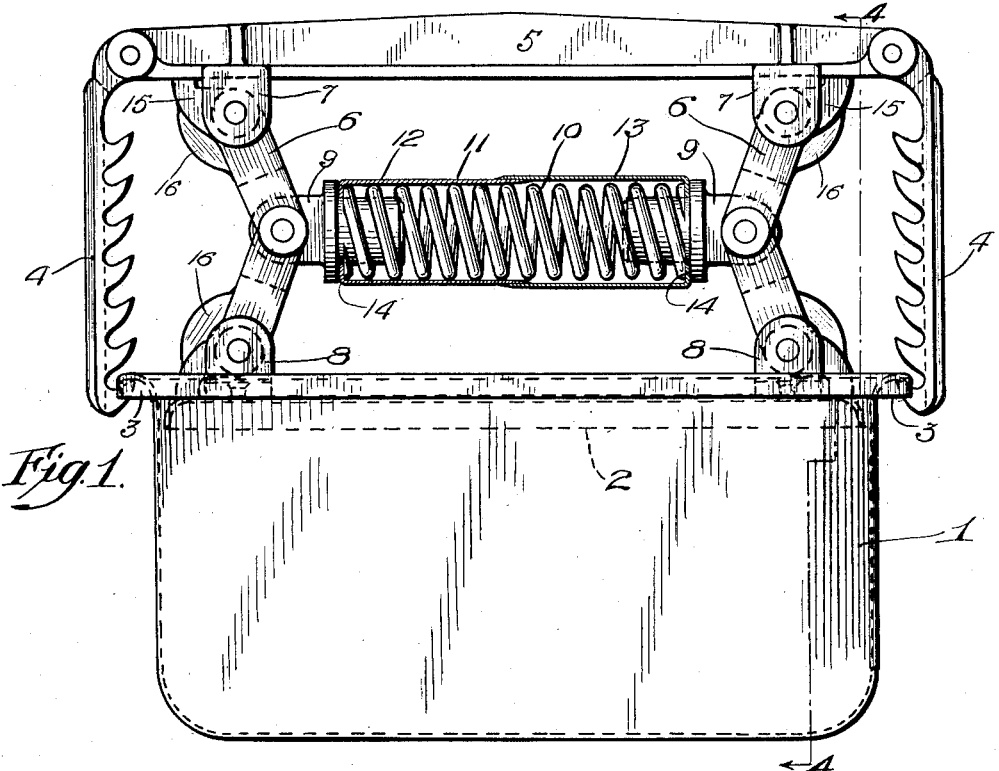
Figure 1 is a side elevational view of one form of device in its open or inoperative condition.
Figure 2:
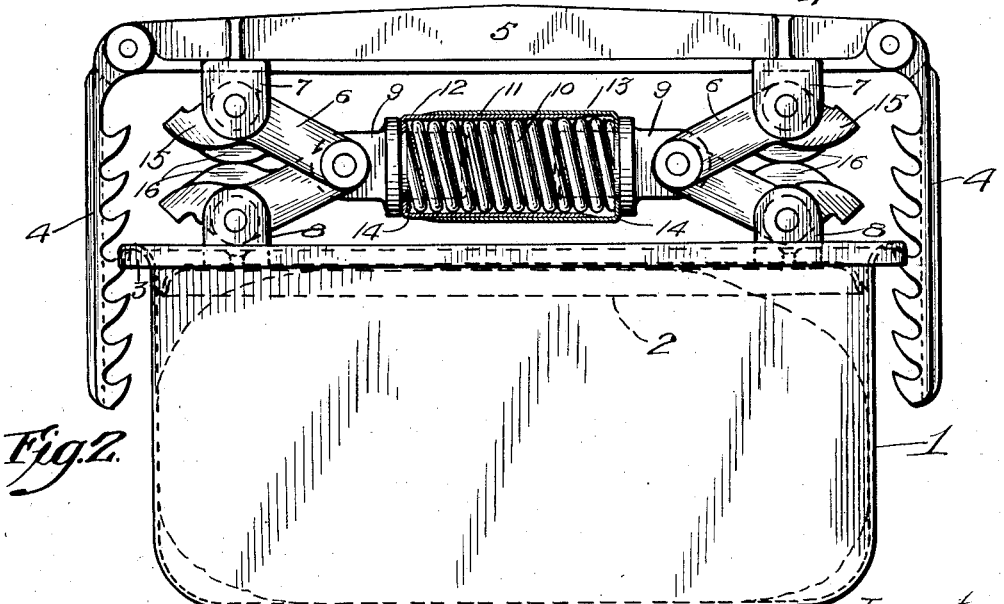
Figure 2 is a similar view of the same device in operative condition.
Figure 6:
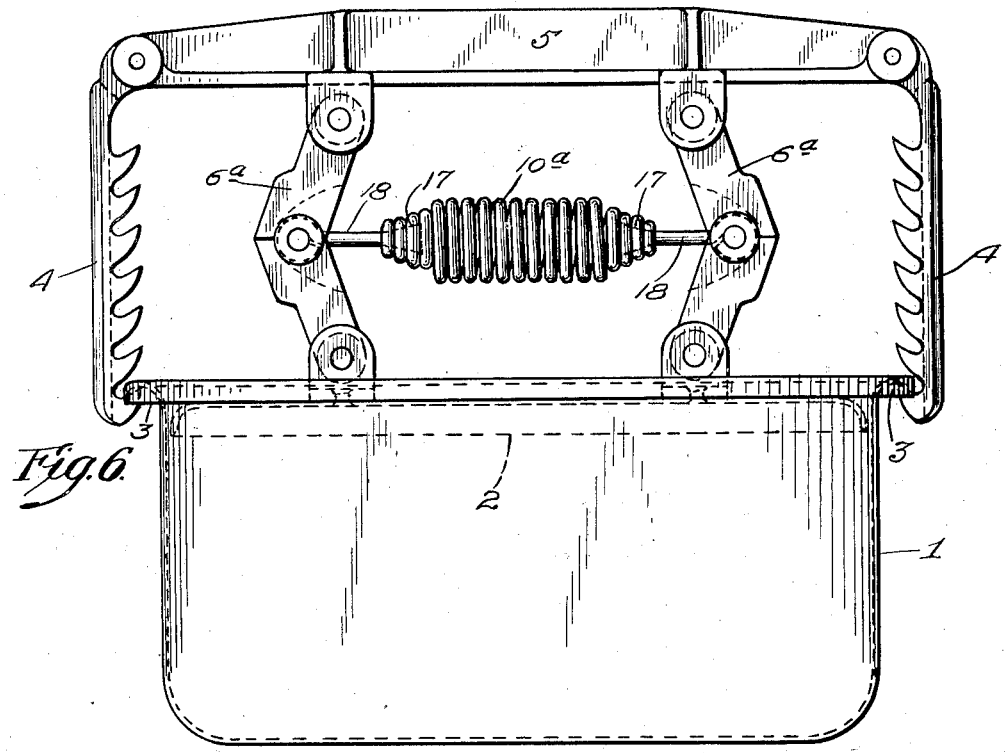
Figure 6 is a side elevational view of an alternative form of the device showing the same in inoperative condition.

Referring now to Figs. 1 to 5 of the drawings and, more particularly, to Figs. 1 and 2, the device comprises a casing 1, the bottom and vertical walls of which are shaped to impart to the meat loaf to be molded any desired contour or shape. A pressure plate 2 is of such dimension that it snugly enters the casing and its lower or inner surface is of such shape that it coacts with the bottom and walls of casing 1 to complete the desired molding contour. The vertical walls of casing 1 at their upper extremities are curved outward to provide a peripheral flange 3 with which the ratchet members 4 cooperate. These ratchet members are pivotally attached to the opposed ends of a cross bar 5. A pair of spaced toggle links 6 connects cross-bar 5 to the pressure plate 2, attachment ears 7 and 8 being provided on the cross-bar and pressure plate, respectively, for this purpose. Attached to each toggle link at the central pivot point thereof is a flanged boss 9. A coiled or helical spring 10 is disposed between the toggle links with its ends surrounding the bosses as illustrated. A telescopic casing 11 comprising sections 12 and 13 completely houses the spring. The ends of this casing may be flanged inwardly as at 14 so that they may be positioned over the bosses adjacent the spring ends.

By means of this construction, cross-bar 5 may be adjustably attached in any desired position to casing 1 by simply moving the bar and causing the ratchet members to lock in the desired position. In Fig. 1, the bar is shown in its uppermost position and at such time the spring is under practically no tension. The upper limit of movement of bar 5 is established by the stop portions 15 formed on the toggle links, as shown clearly in Fig. 5. The lower limit of movement of the bar is established by the stop pillows 16 also formed on the toggle links. Stops 15 engage bar 5 and pressure plate 2, as illustrated in Fig. 1, while the pillow stops 16 abut against each other as shown in Fig. 2.

The device is shown in its maximum closed position in Fig. 2, bar 5 having been moved downward and the ratchet members being set in the adjusted position. The meat loaf to be treated, which may be a ham or other such object, is outlined within the casing by broken lines. Spring 10 is placed under compression by collapse of the toggle links. During the heat treatment of the meat loaf which is commonly employed, the meat gives off juices which are allowed to escape through the small space between the casing and pressure plate. As a result, the meat loaf shrinks or contracts and it gradually assumes the shape of the container, becoming more homogeneous in structure. Pressure plate 2 follows the shrinking or contracted meat loaf due to the stored energy in spring 10 which tends to expand the toggle links. As the pressure plate lowers, continuous pressure is thus applied until the movement of the pressure plate is limited by the stops. This operation may be repeated in successive steps, if desired, the device being adjusted after each molding step.

In the modification of Fig. 5A, a pair of coiled or helical springs 10 are provided instead of a single spring, as in the above described device. In this case, there are provided four of the flanged bosses 9 to accommodate the four ends of the two springs. The bosses are pivotally attached to the toggle links as before. The operation of this device is substantially the same as that of the device above described, the only difference being that in this case, the pressure is applied by means of the two springs instead of one and the operation and application of the desired pressure is, therefore, smoother and more uniform. The use of the two springs, however, to be applied to large sized casing only.

Figure 7:
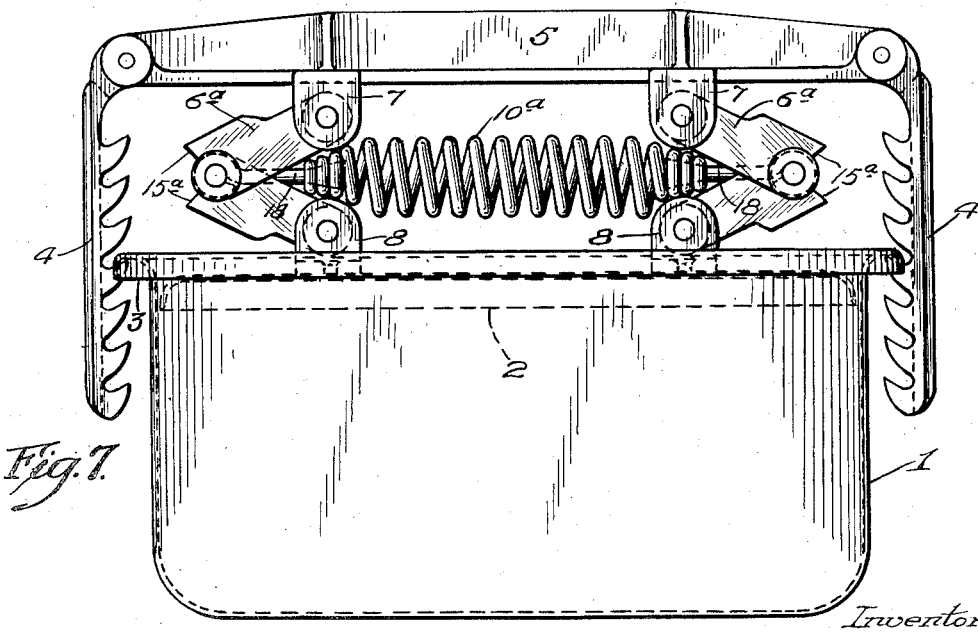
Figure 7 is a similar view of the same device in operative condition.

In Figs. 6 to 11, there is illustrated an alternative form of the device which comprises the same elements as the device of Figs. 1 to 5, these elements being similarly designated on Figs. 6 to 11. In this alternative form of the device, however, the toggle elements 6a are slightly modified and are arranged to collapse outwardly, as clearly illustrated in Figs. 6 and 7. A modified form of coiled or helical spring 10a is connected between the toggle links as before and is arranged to be stretched or put under tension by collapse of the toggle elements, as shown in Fig. 7. The ends of the spring are preferably tapered as illustrated and they surround the flared or conical ends 17 of pins 18 (see Fig. 10). These pins take the place of the flanged bosses of the above described device, serving to anchor or fasten the ends of the spring to the toggle elements at the central pivot point thereof. As shown clearly in Fig. 10, the pins 18 may be secured to the toggle elements by passing around the pivot pin thereof.

In this device, the abutment of the toggle links with the ends of the spring, as shown clearly in Fig. 7, serves to limit the downward movement of the cross-bar 5 with respect to casing 1. Upward movement of the cross-bar is limited by the abutment of stops 15a of the toggle elements, as shown clearly in Fig. 6.

The operation of this device is substantially the same as above described. In this case, however, adjustment of the cross-bar and collapse of the toggle elements places spring 10a under tension rather than compression, storing energy in the same. As the meat being treated shrinks or contracts and the pressure plate lowers, the toggle links expand under the influence of the energy stored in the spring, which exerts a continuous inwardly pulling force on each of the toggle links at the central pivot point thereof. The desired continuous pressure is thus exerted upon the pressure plate as before.

In Fig. 11A, there is shown a modification of this device which involves two springs 10a instead of one. The toggle links are constructed and arranged as before, these elements exerting tensioning force on springs 10a when they collapse. Aside from this change in construction, the device is similar and operates in substantially the same manner as the device of Figs. 6 to 11. Here again, the provision of two springs instead of one, has the advantage that the pressure is more uniformly applied. By the provision of a pair of toggle links adapted to bear upon the corresponding ends of the pressure plate, with an intermediate spring for actuating said toggle links, a self-equalizing pressure device is produced, in that, if the meat in the mold is initially of smaller dimensions at one end of the mold than at the other, as is often the case, or if the meat should shrink more at one end than at the other, greater pressure will be exerted upon the portion of the meat having the larger dimensions, thus tending to produce uniformity of contour in the finished product.

Although several embodiments of the invention have been illustrated and described herein, it will be understood that further modifications and changes are possible without departing from the spirit and scope of the invention.

Having now described my invention, what I claim as new and desire to secure by Letters Patent, is:

1. In a meat molding and processing device, comprising a mold adapted to receive the meat to be treated, a pressure plate movable within said mold, an anchor member exterior of said mold, and means for adjustably securing said anchor member in spaced relation to said mold, a toggle coacting with said anchor member and said pressure plate, and yielding means for actuating said toggle connection.

2. In a meat molding and processing device, comprising a mold adapted to receive the meat to be treated, a pressure plate movable within said mold, an anchor member exterior of said mold, and means for adjustably securing said anchor member in spaced relation to said mold, a pair of toggles coacting with said anchor member and said pressure plate, and a spring device intermediate same and adapted to actuate said toggles.

3. In a meat molding and processing device, comprising a mold adapted to receive the meat to be treated, a pressure plate movable within said mold, an anchor member exterior of said mold, and means for adjustably securing said anchor member in spaced relation to said mold, a pair of toggles coacting with said anchor member and said pressure plate, a yielding device intermediate same and adapted to actuate said toggle connections, and means carried by said toggles and coacting with said anchor member and said pressure plate for limiting the movement of said toggle connections.

4. In a meat molding and processing device, comprising a mold adapted to receive the meat to be treated, a follower plate movable therein, an anchor member exterior thereof, means for adjustably securing said anchor member to said mold, a toggle connection common to said anchor member and said follower plate, a spring for actuating said toggle connection, and a casing enclosing said spring.

5. In a meat molding and processing device comprising a mold adapted to receive the meat to be treated, a pressure plate movable within said mold and an anchor member exterior of said mold, a toggle mechanism operatively coacting with said anchor member and said pressure plate to exert pressure on the latter.

6. In a meat molding and processing device comprising a mold adapted to receive the meat to be treated, a pressure plate movable within said mold, and an anchor member exterior of said mold, a toggle mechanism operatively coacting with said anchor member and said pressure plate, said toggle mechanism having a spring for exerting pressure thereon.

STANLEY F. GLEASON.